(No Model.)  3 Sheets—Sheet 1.

F. E. TOWER.
SEED DRILL.

No. 299,038. Patented May 20, 1884.

WITNESSES
S. E. Thomas
N. S. Wright

INVENTOR
Fred E. Tower
By W. W. Seggers
Attorney (No Model.) 3 Sheets—Sheet 2.
F. E. TOWER.
SEED DRILL.
No. 299,038. Patented May 20, 1884.
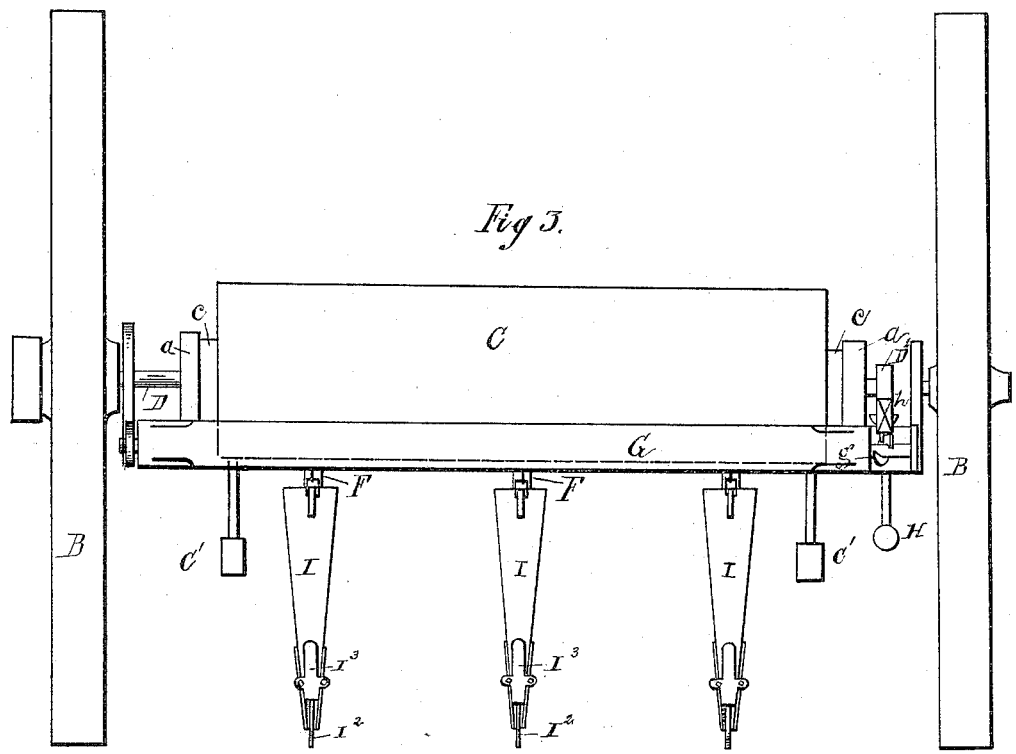
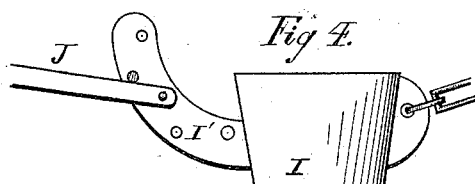
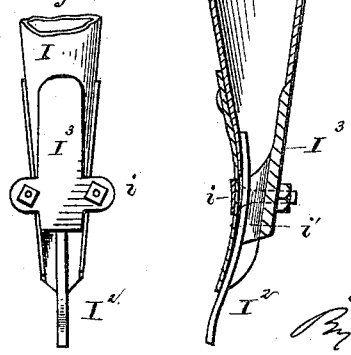
WITNESSES
Samuel E Thomas
N. S. Wright
INVENTOR
Fred E. Tower
By W. W. Jaggers
Attorney (No Model.)　　　　　　　　　　　　　　　　　3 Sheets—Sheet 3.
F. E. TOWER.
SEED DRILL.
No. 299,038.　　　　　　　　　Patented May 20, 1884.
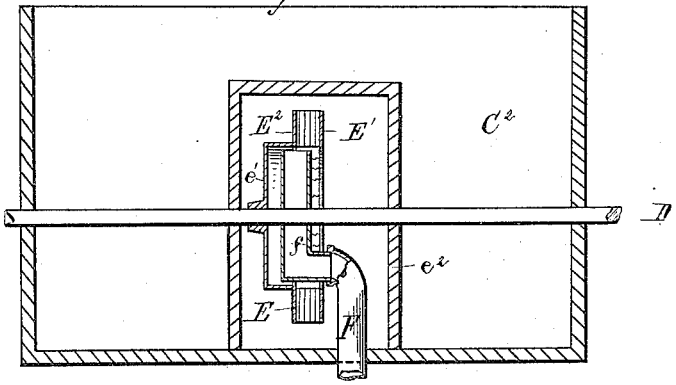
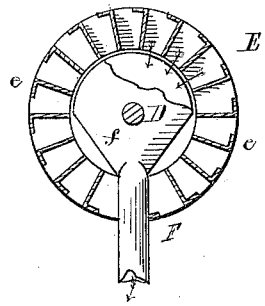
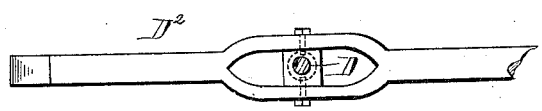 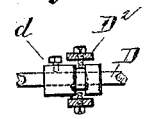
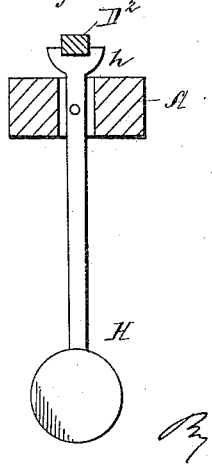
WITNESSES　　　　　　　　　　　　　　　INVENTOR

UNITED STATES PATENT OFFICE.

FRED E. TOWER, OF MILFORD, MICHIGAN, ASSIGNOR OF ONE-HALF TO SOLON H. WILHELM, OF SAME PLACE.

SEED-DRILL.

SPECIFICATION forming part of Letters Patent No. 299,038, dated May 20, 1884.

Application filed July 2, 1883. (No model.)

*To all whom it may concern:*

Be it known that I, FRED E. TOWER, of Milford, county of Oakland, State of Michigan, have invented a new and useful Improvement in Seed-Drills; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

Figure 1:
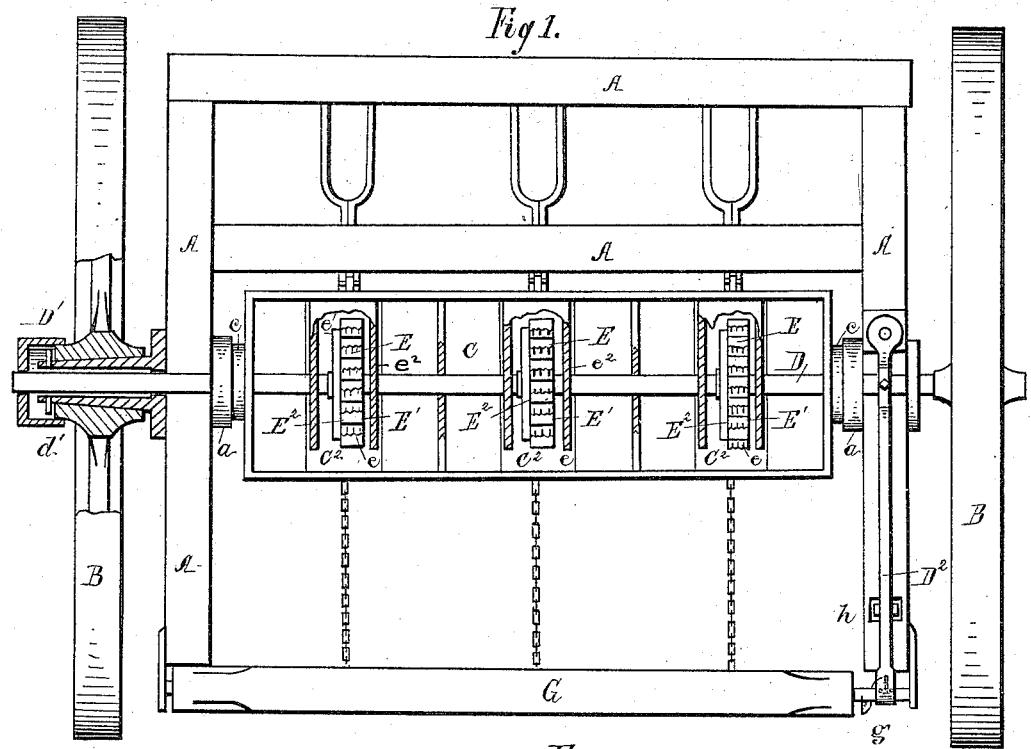
Figure 2:
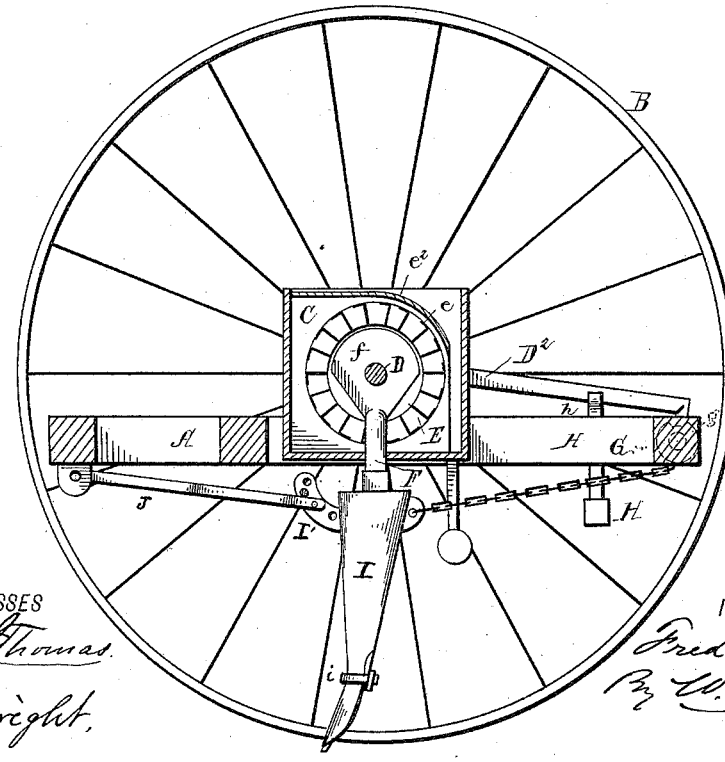

In the drawings, Figure 1 represents a plan view of a device embodying my invention, showing parts in section. Fig. 2 is a vertical cross-section. Fig. 3 is a rear elevation illustrating how the seed-box is kept level and the feed-shaft is regulated. Fig. 4 is a separate view, partly in section and partly in elevation, of my improved drill-hoe and drill-point. Fig. 5 is a rear elevation of a portion of the same. Fig. 6 is a longitudinal section of one of the hoppers with its feed-wheel and seed-tube and the cap for regulating the supply of seed thereto. Fig. 7 is a separate view of one of the feed-wheels with one of the sides removed. Fig. 8 is a side elevation of a portion of the lever. Fig. 9 is a separate view of the weight whereby said lever is automatically operated. Fig. 10 is a separate view of the adjustable collar.

My invention relates to seed-drills, and has for its object, first, an improved construction of the feed-wheels and seed-tubes for conducting the seed into the drill-hoes; second, an improved method of mounting the seed-box upon the frame of the drill; third, improved mechanism for controlling the operation of the shaft upon which the feed-wheels are located; fourth, improved means for keeping the seed-box properly suspended in the frame; fifth, for automatically regulating the shaft upon which the feed-wheels are mounted, so as to control the amount of seed thrown by the feed-wheels into the seed-tubes on uneven ground; sixth, an improved construction of the drill-hoes and drill-points attached thereto for sowing grass-seed.

I carry out my invention as follows:

In the drawings, A represents the frame of the seeder. B represents the drive-wheels. C represents the seed-box.

I desire to suspend the seed-box upon the frame in such a manner that the box will be kept level in going up and down hill. For this purpose the seed-box is provided with a poise, $c$, at each end, and the frame with a supporting-collar, $a$, the construction of the poise and the collar being such that the one will fit about the other in such a manner that the box may keep an upright position. In order to more effectually accomplish this result, I prefer to provide the box with one or more weights, $C'$, the gravity of which will facilitate keeping the box level. The seed-box is divided off into suitable hoppers, $C^2$, through which a longitudinal shaft, D, passes, said shaft provided with suitable bearings. Within the various hoppers is a feed-wheel, E, said wheel provided with a series of buckets, $e$, preferably corrugated, located between two lateral bands, $E'$ and $E^2$, the buckets opening to the periphery of the wheel, the construction being such that as the wheel is rotated said buckets will work under the grain, the grain being gathered thereon by the outer edge of the bucket and discharged from the inner edge of the bucket.

F is a seed-tube adapted to conduct seed from the hopper into the drill-hoes. Said seed-tubes are provided at their top with a conducting-spout, $f$, preferably in the shape of a segment of a circle, as shown, of such a diameter as to be located within the feed-wheel. In order that the wheel may have free rotation, the seed-tube is curved, as shown. I also construct the feed-wheel with a flange, $e'$, adapted to form a partial or entire cover to the spout. I prefer, also, that the buckets should be of such dimensions as to extend into close proximity to the edge of the spout, to facilitate the deposit of grain therein. The shaft upon which these feed-wheels are located is made adjustable to and fro in the seed-box, so as to regulate the size of the space at which the spout will be open for the reception of seed from the buckets of the feed-wheel. It will be evident that by projecting the shaft in one direction the flanges $e'$ upon the feed-wheels will be projected correspondingly over the aperture of said spouts, thereby closing more or less said apertures, and consequently enabling the operator to control thereby the amount of seed fed by the buckets into the seed-tubes; or he may, if desired, entirely close the apertures of the spouts leading to the seed-tubes by projecting the shaft sufficiently in that direction, and, vice versa, by projecting the shaft in the opposite direction, the apertures of said spouts may be opened so as to receive the seed as freely as may be desired. To accomplish this result and enable the operator to project said shaft to and fro within the seed-box, and consequently the feed-wheels upon or off the spouts leading to the seed-tubes, said shaft is provided at one extremity with suitable mechanism—as, for instance, an adjustable collar and set-screw, $d$, by means of which the shaft may be set for any given feed desired. In order that the feed may be wholly stopped whenever it may be desired, the shaft D is extended at one end so as to pass through the axle of the wheel, as shown at D', the extremity of the shaft being provided with a suitable clutch, $d'$, the hub of the wheel being so constructed that by projecting said shaft to or fro the clutch may be engaged therewith or disengaged therefrom, as may be desired, in such a manner that when the clutch is properly engaged the shaft will be rotated and the feed-wheels thereon, and when said clutch is disengaged the shaft will cease to rotate.

$D^2$ is a lever having its fulcrum upon the frame, and riveted to a yoke upon the shaft, or otherwise connected with the shaft in such a manner that by moving the lever in the proper direction the shaft may be projected forward or backward, as the operator may prefer. In order to adjust said lever and shaft simultaneously with the elevation or depression of the drill-hoes, the elevating-bar G is adapted to be rotated for the purpose of raising and lowering the drill-hoes in the usual manner, and may be provided with the worm or screw $g$, or other suitable mechanism adapted to engage the arm of the lever $D^2$, so that when the bar G is rotated the lever will be operated simultaneously therewith, as will be desirable in transporting the drill from one field to another and in turning about in the field. In order to adjust the feed automatically on uneven ground, I desire to provide the frame of the drill with a weight, H, suitably suspended thereto, said weight provided with an arm, $h$, projecting freely through the frame and forked at its upper end to receive the arm of the lever, the construction being such that the weight will hold the lever in a straight position on even ground, and when either end of the frame is elevated above the other the arm of the weight will throw the lever in a corresponding direction either to or fro as one end or the other of the frame is elevated, and thus automatically regulate the adjustment of the feed-wheels upon the spouts of the seed-tubes, and thus prevent any irregularity in the feeding of the seed, otherwise liable to occur on uneven ground. I prefer to provide each of the feed-wheels with a suitable cap, $e^2$, extending suitably forward over the same, to prevent an undue amount of seed being precipitated upon said wheels, whereby clogging may be prevented and the operation of said wheels be rendered more efficient. I do not, however, limit myself to the provision of such a cap, as the grain in the seed-box may be kept from crowding the wheel unduly in any other suitable manner.

I represents my improved drill-hoe. In order to regulate the angle of this hoe in its operation in the soil, I construct it with a perforated arm, I', which may be adjusted upon the draw-bars J by means of a suitable pin.

$I^2$ is a small supplementary tooth adapted more particularly for use in sowing grass-seed, secured into or upon the drill-hoe in any suitable manner—as, for instance, by means of a tongue, $I^3$, adapted to project into the mouth of the hoe against said tooth, the tongue being held in place by means of a clip, $i$. This tongue is constructed with a contracted opening, $i'$, thereby affording a suitably-contracted passage for sowing grass-seed, so that it shall be directed properly behind the supplementary point of the drill-hoe, the construction being such that the supplementary tooth $I^2$ may be readily located in place for the sowing of grass-seed, and also be readily removed when the drill is desired for other uses. It will be convenient to construct this supplementary tooth of suitable length, so that as it wears away it may be projected downward and bent into suitable shape, as may be desired. I would have it understood, however, that I do not limit myself to this particular mode of securing the supplementary tooth in place, nor to this particular method of contracting the orifice of the drill-hoe for sowing grass-seed, as said hoe might be provided with an auxiliary tube or channel adjustably secured therein in any proper manner.

I am aware of the patent granted to H. M. Keith, June 6, 1882, No. 258,928, wherein is shown a shaft passing through the feed-box and provided with a series of circular bands, to the inner circumference of which are secured a series of buckets arranged transversely of the band, and adapted to take up seed at one side of the band and discharge it at the other side into an inclined tray communicating with a vertical spout located outside of the band and opening into the drill-tubes. I lay no claim to anything shown in said patent; and my invention differs therefrom in having the buckets located between lateral faces of the wheel and opening from the periphery of the wheel, and adapted to discharge the seed through the bottom of the buckets into the vertical spout located within the wheel, and in other particulars hereinbefore described and hereinafter specified in the claims.

What I claim is—

1. In a seed-drill, the combination, with a suitable hopper, of a seed-tube provided with a vertical spout leading thereto, and a feed-wheel mounted upon a shaft, said wheel provided with buckets open to the periphery of the wheel, said buckets adapted to gather the grain upon the edges at the periphery of the wheel and to discharge it into said spouts from the opposite side, substantially as described.

2. In a seed-drill, the combination, with a suitable hopper provided with a seed-tube constructed with a spout leading thereto, of a feed-wheel mounted upon a shaft, said wheel provided with buckets opening upon the periphery of the wheel between two lateral faces, one of said faces provided with a flange adapted to project more or less over the top of the spout, substantially as described.

3. In a seed-drill, the combination, with a suitable hopper, of a seed-tube provided with a spout constructed in the form of a segment of a circle, and a feed-wheel having buckets located between two lateral faces, said buckets opening on the periphery of the wheel, the diameter of the wheel being such that the spout may be located within the circumference of the inner edges of the buckets, one of said faces of the wheel provided with a flange adapted to project more or less over the mouth of the spout, the construction being such that grain may be gathered upon the buckets at the periphery of the wheel and discharged from the opposite side into the spout as the wheel is rotated, substantially as described.

4. In a seed-drill, the combination, with a suitable hopper provided with a seed-tube and a vertical spout communicating therewith, of a feed-wheel mounted upon a shaft provided with buckets located between two lateral faces, said buckets opening upon the periphery of the wheel, said buckets adapted to gather seed thereon at the edges adjacent to the periphery and to discharge it into said spout from the opposite edge, one of said faces of the wheel constructed with a flange adapted to be projected more or less over the mouth of the spout, and mechanism for adjusting the relation of the feed-wheel and the spout, substantially as and for the purpose set forth.

5. In a seed-drill, one or more suitable hoppers, each provided with a seed-tube communicating with a vertical spout, a feed-wheel mounted upon a shaft provided with buckets located between two lateral faces, said buckets opening to the periphery of the wheel, and adapted to gather grain thereon at the periphery and to discharge it into the spout on the opposite side, and mechanism for regulating the adjustment of said shaft in relation to said spouts, substantially as described.

6. In a seed-drill, a feed-box consisting of one or more hoppers, each provided with a seed-tube communicating with a vertical spout, a feed-wheel mounted upon a shaft provided with buckets located between two lateral faces and opening at the periphery of the wheel upon the opposite edge, and means for regulating the adjustment of said wheels in relation to said spouts, consisting of a suitable collar and set-screw located upon one end of the shaft, the construction being such that the mouth of the spout may be more or less opened to receive seed from the buckets, substantially as described.

7. In a seed-drill, a feed-box consisting of one or more suitable hoppers, each of said hoppers provided with a seed-tube communicating with a vertical spout, a feed-wheel mounted upon a shaft, said wheel provided with buckets opening upon the periphery of the wheel and adapted to discharge grain into the spout from the opposite edge, said wheel constructed to project more or less over the mouth of the spout, said shaft extended at one end so as to pass through the hub of one of the drive-wheels, and provided at its outer end with a clutch, and means for engaging said clutch upon the hub and disengaging it therefrom, substantially as described.

8. In a seed-drill, a suitable hopper provided with a seed-tube communicating with an interior vertical spout and feed-wheel mounted upon a shaft, said wheel provided with buckets located between two lateral faces, said buckets opening upon the periphery of the wheel and adapted to discharge grain into said spout as the wheel is rotated, said wheel constructed to be projected more or less over the mouth of the spout, and in combination therewith a cap located over said wheel, substantially as and for the purpose set forth.

9. The combination, with a suitable frame, of a feed-box mounted thereon, said box and frame provided with mechanism whereby the box may be kept in a vertical position in going up and down hill, substantially as described.

10. In a seed-drill, the combination, with a suitable frame, of a feed-box weighted at the bottom, mounted thereon, said frame provided with supporting-collars, and said box provided with poises at its ends, adapted to be engaged with said supporting-collars, the construction being such that the box may be kept in a vertical position in going up and down hill, substantially as described.

11. In a seed-drill, a feed-box consisting of one or more hoppers, each provided with a seed-tube communicating with an interior vertical spout, a feed-wheel mounted upon a shaft and adapted to be rotated over the mouth of the vertical spout, said wheel provided with buckets opening to the periphery of the wheel and adapted to discharge seed into said spout, and a lever adapted to regulate the adjustment of said feed-wheels mounted upon said shaft in relation to the spouts, substantially as described.

12. The combination of a feed-box consisting of one or more suitable hoppers, each provided with a seed-tube communicating with an internal spout, a feed-wheel mounted upon a shaft adapted to be rotated over the mouth of the spout, said wheel provided with buckets opening to the periphery and adapted to discharge grain into the spout, a lever adapted to regulate the adjustment of said wheels in relation to said spouts, mechanism for raising and lowering the drill-hoes, and mechanism connected therewith adapted to operate said lever simultaneously with the raising and lowering of the hoes, substantially as described.

13. The combination, in a seed-drill, of a feed-box consisting of one or more suitable hoppers, each provided with a seed-tube communicating with an interior spout, a feed-wheel mounted upon a shaft adapted to be rotated over the mouth of the spout, said wheel provided with buckets opening to the periphery and adapted to discharge grain into the spout, a lever adapted to regulate the adjustment of said feed-wheels and spouts in relation to each other, and mechanism for automatically operating said lever, substantially as described.

14. In a seed-drill, the combination, with a feed-box consisting of one or more suitable hoppers, each provided with a seed-tube communicating with an interior spout, of a feed-wheel mounted upon a shaft and adapted to be rotated over the mouth of the spout, said wheel provided with buckets opening to the periphery and adapted to discharge the grain into the spout as the wheel is rotated, a lever adapted to regulate the adjustment of the feed-wheels and the spouts in relation to each other, and a weight suspended in the frame of the drill and provided with a projecting arm adapted to engage with the arm of the lever, the construction being such that in passing over uneven ground said lever will be automatically adjusted, substantially as described.

15. In a seed-drill, the combination, with a drill-hoe, of a supplementary point adjustably secured therein, substantially as and in the manner described.

16. In a seed-drill, the combination, with a drill-hoe, of an auxiliary channel adjustably secured therein, substantially as and for the purpose set forth.

17. In a seed-drill, the combination, with a drill-hoe, of a supplementary point secured therein by means of a tongue, $I^3$, clipped upon the hoe, said tongue provided with a contracted orifice adapted for the sowing of grass-seed, substantially as described.

In testimony whereof I sign this specification in the presence of two witnesses.

FRED E. TOWER.

Witnesses:
N. S. WRIGHT,
J. A. RUTHERFORD.